(12) United States Patent
Krupka et al.

(10) Patent No.: US 8,831,294 B2
(45) Date of Patent: Sep. 9, 2014

(54) BROADCAST IDENTIFIER ENHANCED FACIAL RECOGNITION OF IMAGES

(75) Inventors: Eyal Krupka, Shimshit (IL); Igor Abramovski, Haifa (IL); Igor Kviatkovsky, Haifa (IL)

(73) Assignee: Microsoft Corporation, Redmond, WA (US)

( * ) Notice: Subject to any disclaimer, the term of this patent is extended or adjusted under 35 U.S.C. 154(b) by 612 days.

(21) Appl. No.: 13/162,595

(22) Filed: Jun. 17, 2011

(65) Prior Publication Data

US 2012/0321143 A1    Dec. 20, 2012

(51) Int. Cl.
*G06K 9/00* (2006.01)
(52) U.S. Cl.
CPC ........ *G06K 9/00221* (2013.01); *G06K 9/00677* (2013.01)
USPC .......................................... 382/118; 382/218
(58) Field of Classification Search
USPC ......... 348/221.1; 382/118, 218; 708/204, 213
See application file for complete search history.

(56) References Cited

U.S. PATENT DOCUMENTS

| 7,068,309 | B2 |   | 6/2006  | Toyama et al. |        |
|-----------|----|---|---------|---------------|--------|
| 7,274,822 | B2 |   | 9/2007  | Zhang et al.  |        |
| 8,194,939 | B2 | * | 6/2012  | Perlmutter et al. | 382/118 |
| 8,369,570 | B2 | * | 2/2013  | Myers et al.  | 382/103 |
| 8,436,911 | B2 | * | 5/2013  | Leebow        | 348/222.1 |
| 2004/0156535 | A1 | * | 8/2004  | Goldberg et al. | 382/115 |
| 2009/0252383 | A1 |   | 10/2009 | Adam et al.   |        |
| 2009/0316961 | A1 |   | 12/2009 | Gomez Suarez et al. |  |
| 2010/0216441 | A1 |   | 8/2010  | Larsson et al. |       |
| 2010/0238919 | A1 | * | 9/2010  | Froelich      | 370/352 |
| 2010/0257239 | A1 | * | 10/2010 | Roberts       | 709/204 |
| 2010/0310134 | A1 |   | 12/2010 | Kapoor et al. |        |
| 2011/0013810 | A1 |   | 1/2011  | Engstrom et al. |      |
| 2012/0311623 | A1 | * | 12/2012 | Davis et al.  | 725/18 |
| 2012/0314917 | A1 | * | 12/2012 | Kiyohara et al. | 382/118 |
| 2012/0321143 | A1 | * | 12/2012 | Krupka et al. | 382/118 |

OTHER PUBLICATIONS

Stone, et al., "Autotagging Facebook: Social Network Context Improves Photo Annotation", Retrieved at <<http://ieeexplore.ieee.org/stamp/stamp.jsp?tp=&arnumber=4562956>>, 2008, pp. 8.
Schuon, et al., "CS229 Project Report: Automated Photo Tagging in Facebook", Retrieved at <<http://www.stanford.edu/class/cs229/proj2007/SchuonRobertsonZou-AutomatedPhotoTag-gingInFacebook.pdf>>, Retrieved Date: Mar. 8, 2011, pp. 5.
"Ranking Based on Facial Image Analysis", U.S. Appl. No. 61/309,029, filed Mar. 1, 2010, pp. 1-34.

(Continued)

*Primary Examiner* — Gregory M Desire
(74) *Attorney, Agent, or Firm* — Pablo Tapia; Carole Boelitz; Micky Minhas

(57) ABSTRACT

A system may recognize faces within an image by using wireless identifiers captured at the time the image was taken to determine a list of candidates for facial recognition. A database may contain people associated with one or more wireless identifiers, which may be identifiers associated with various protocols, such as Bluetooth, cellular telephones, WiFi, or other protocols. In some cases, the list of candidates may be expanded by using candidate's social networks. The recognized faces may be tagged in the image as metadata, then used in various scenarios. In one scenario, an album of images from an event may be created by matching people who were tagged in images. In another scenario, people may exchange business contact information or social network contacts by taking images of each other.

20 Claims, 5 Drawing Sheets

(56) References Cited

OTHER PUBLICATIONS

Gallagher, et al., "Image Annotation Using Personal Calendars as Context", Retreived at <<http://chenlab.ece.cornell.edu/people/Andy/Andy_files/ctsp4175-gallagher.pdf>>, Oct. 26-31, 2008, pp. 4.

"Supplementing Biometric Identification With Device Identification", U.S. Appl. No. 12/970,100, filed Dec. 16, 2010, pp. 1-36.

"Microsoft OneAlbum: Fusing Facial Recognition and Social Networks—The Future of Windows Live Photos?", Retrieved at <<http://www.liveside.net/2010/03/04/microsoft-onealbum-fusing-facial-recognition-and-social-networks-the-future-of-windows-live-photos/>>, Retrieved Date : Mar. 8, 2011,pp. 6.

Varshney, Lav.R., "Identity Annotation in Photo Collections: A Survey", Retrieved at <<http://www.mit.edu/~Irv/MAS/phototagging4.pdf>>,May 14, 2008, pp. 12.

"Tagsback", Retrieved at <<http://www.tagsback.com/>>, Retrieved Date : Mar. 7, 2011, p. 1.

\* cited by examiner

BROADCAST IDENTIFIER ENHANCED FACIAL RECOGNITION OF IMAGES

BACKGROUND

Electronic images are ubiquitous in society. A vast majority of cellular telephones contain cameras, and many people have pocket sized cameras that are capable of taking high quality pictures. When people interact, there is a good chance that someone will document the interaction with a picture. The pictures may be shared with each other by directly sending images to each other or through various social networks.

SUMMARY

A system may recognize faces within an image by using wireless identifiers captured at the time the image was taken to determine a list of candidates for facial recognition. A database may contain people associated with one or more wireless identifiers, which may be identifiers associated with various protocols, such as Bluetooth, cellular telephones, WiFi, or other protocols. In some cases, the list of candidates may be expanded by using candidate's social networks. The recognized faces may be tagged in the image as metadata, then used in various scenarios. In one scenario, an album of images from an event may be created by matching people who were tagged in images. In another scenario, people may exchange business contact information or social network contacts by taking images of each other.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
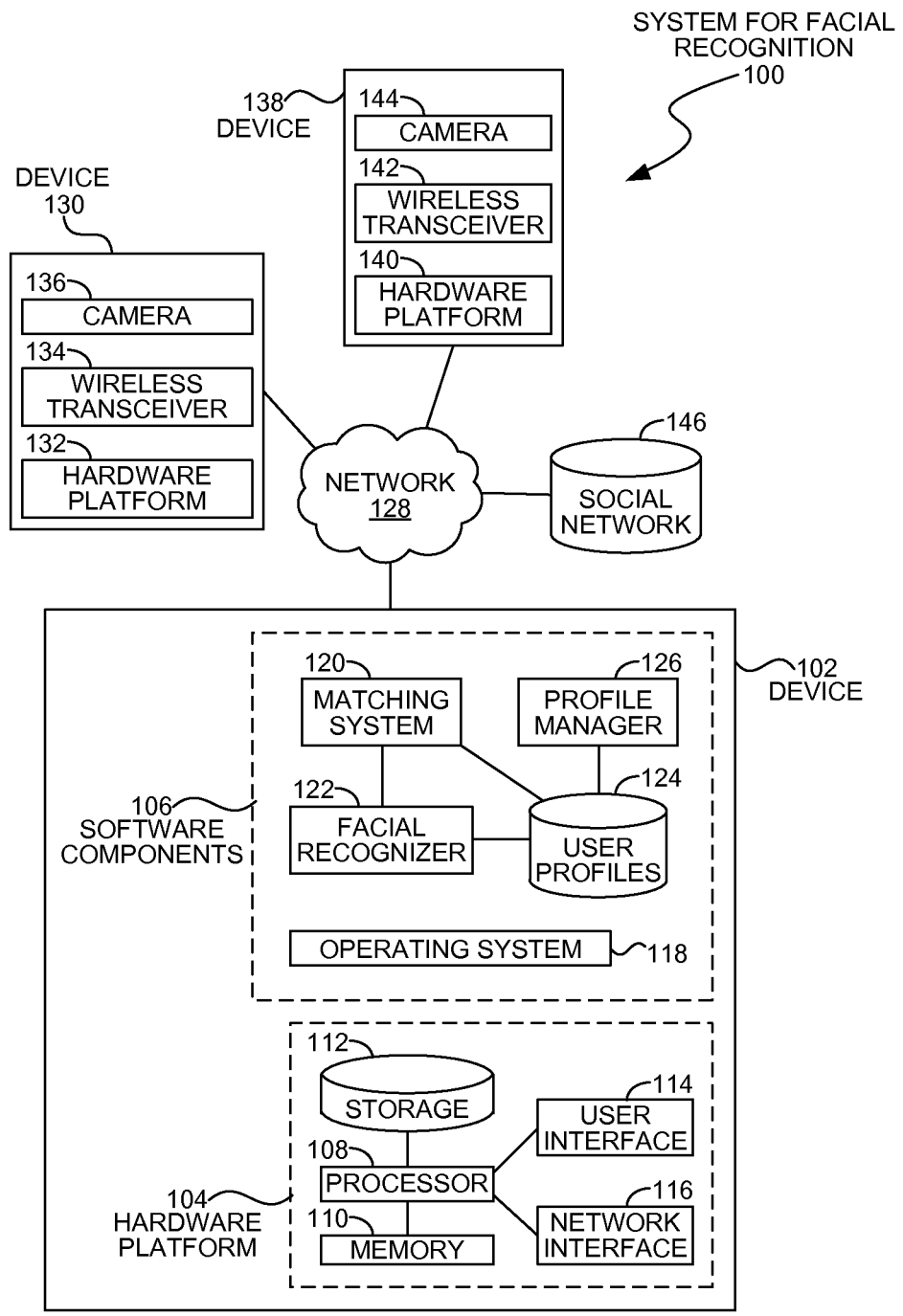
FIG. 1 is a diagram of an embodiment showing a network environment with a system for facial recognition.

A facial recognition system may recognize faces in images by using a set of potential candidates determined from broadcast identifiers from nearby devices. At the time an image is taken, a camera, cellular telephone, or other device may capture the broadcast identifiers of other nearby devices and associate the broadcast identifiers as metadata to the image.

The system may query a database that contains broadcast identifiers associated with individual people to determine a relatively small set of candidates for facial recognition, then the facial recognition system may analyze those candidates for matches. In some embodiments, the set of candidates may be augmented by social network contacts of the people identified from the broadcast identifiers.

Once the images are tagged with identified people, the images may be grouped into various albums that may be shared with the identified people. In another use scenario, people may exchange social network or other contact information merely by taking pictures of each other.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100, showing a device 102 that may perform facial recognition on images and may match those images together for various applications. Embodiment 100 is a simplified example of a system that may process images collected from various devices and use broadcast identifiers collected at the place and time the image is created to simplify facial recognition and group images together.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a system that may use broadcast identifiers collected by an image gathering device to assist in facial recognition and grouping of images. An image gathering device may be a device such as a cellular telephone or portable camera that may have a camera mechanism to gather an image as well as a wireless receiver that may collect broadcast identifiers from nearby devices.

Many different types of wireless devices may have unique identifiers associated with the devices. Many different types of wireless standards may enforce unique identifiers for each compatible device. For example, Bluetooth personal area network (PAN) devices may have unique identifiers associated with any Bluetooth device. Similarly, each wireless local area network (LAN) device that operates an IEEE 802.11 or IEEE 802.16 device may have a unique Media Access Control (MAC) identifier. In a cellular telephone network, each device compatible with the network may have an Electronic Serial Number (ESN) that is unique to the device. Many other wireless systems may have other identification schemes.

The wireless devices may continually broadcast their wireless identifiers while the devices are turned on and their radios are broadcasting. The wireless identifiers may be used within the particular wireless standard as part of a mechanism for establishing one-way or two-way communications with the device. For example, a Bluetooth device may periodically broadcast its identifier so that a listening device may recognize the device and establish a pairing with the device, if such a pairing has been previously established.

Many wireless standards may have a mechanism for configuring a two-way wireless communication session, and many such standards may have a defined protocol for establishing an initial connection and later reconnecting with or without user interaction. Such standards may operate by detecting the presence of a broadcasting device and automatically establishing a communication session. The presence may be determined when the device broadcasts a unique identifier within range of another device operating the same protocol.

The image gathering devices may monitor the broadcast identifiers from nearby devices. In many embodiments, the devices may not establish two-way communications or perform any acknowledgment of the presence of the broadcasting device. The image gathering devices may operate in a passive manner to merely collect identifiers and the users of the broadcasting devices may not know that the identifiers are being collected.

The broadcasting devices may be any type of radio that transmits an identifier. In many cases, the identifier may be unique, although some embodiments may use non-unique identifiers.

When an image is taken, the broadcast identifiers of nearby devices may be collected and added to the metadata of the image.

A matching service may maintain a database that associates people with their broadcast identifiers. A profile manager may allow a user to login, create a profile, and collect user information and broadcast identifiers for each of the user's various devices. The database containing the broadcast identifiers and user profiles may be used to select a limited group of faces on which to perform facial recognition on a given image.

The broadcast identifiers for various devices, such as Bluetooth devices, cellular telephones, and similar devices may indicate that certain people are likely to be nearby when a picture is taken. This limited group of people may then be used with a facial recognition system to match and tag people in an image.

In many cases, facial recognition and matching may be a computationally expensive process that may yield a low success rate. By limiting the matching to those people likely to be nearby, the computation may be severely reduced while increasing the likelihood of a successful match. In many instances, the accuracy of facial recognition may be increased significantly when the set of possible candidates is reduced. Accuracy may be increased due to the diminished likelihood of confusing two candidates.

A profile management service may assist a user in creating and maintaining a user profile. In a typical use scenario, a user may create a new user profile or associate an existing user profile with the matching service. The user profile may contain any type of information that a user may wish to share or that an application may consume. When editing a profile, a user may identify one or more devices to associate with the profile. The user profile may contain many different device identifiers, including device identifiers from different types of wireless devices.

For example, a user may associate Bluetooth wireless identifiers from a cellular telephone, Bluetooth headset, a laptop computer, a Bluetooth identification dongle, or other Bluetooth device. The same user may also register wireless LAN identifiers for the cellular telephone and laptop computer, and may also register a cellular telephone's cellular identifier as well.

The system of embodiment 100 is illustrated as being contained in a single device 102. The device 102 may have a hardware platform 104 and software components 106. The device 102 may perform both facial recognition and tagging operations, as well as post processing for grouping the tagged images. In some embodiments, each of the various components of the system may be provided by a different hardware platform operating independently of each other.

The device 102 may represent a server or other powerful, dedicated computer system that may support multiple user sessions. In some embodiments, however, the device 102 may be any type of computing device, such as a personal computer, game console, cellular telephone, netbook computer, or other computing device. In some embodiments, device 102 may operate in a cloud computing environment and may have some or all of the various functions virtualized in various manners. Even in a cloud computing environment, a hardware fabric may be made up of multiple instances of the hardware platform 104.

The hardware platform 104 may include a processor 108, random access memory 110, and nonvolatile storage 112. The processor 108 may be a single microprocessor, multi-core processor, or a group of processors. The random access memory 110 may store executable code as well as data that may be immediately accessible to the processor 108, while the nonvolatile storage 112 may store executable code and data in a persistent state.

The hardware platform 104 may include user interface components 114, which may be monitors, keyboards, pointing devices, and other input and output devices. The hardware components 104 may also include a network interface 116. The network interface 116 may include hardwired and wireless interfaces through which the device 102 may communicate with other devices.

The software components 106 may include an operating system 118 on which various applications may execute.

The software components 106 may include a matching system 120, which may perform tagging of an image using a facial recognizer 122 and data contained in user profiles 124. The user profiles 124 may include user information along with broadcast identifiers associated with the various users. In some embodiments, the matching system 120 may use information from one or more social networks 146 to enhance or enlarge the group of candidate people for facial recognition.

The device 102 may be connected to other devices using a network 128. The network 128 may be any network, wired or wireless, where various devices may communicate with each other.

Devices 130 and 138 may represent an image capture device, such as a cellular telephone, portable camera, tablet computer, laptop computer, or other device. Each device 130 and 138 may operate on a hardware platform 132 and 140, respectively, and may include a processor, memory, and other hardware components similar to the hardware platform 104.

Each device may have a wireless transceiver 134 and 142, respectively. The wireless transceiver may receive broadcast identifiers from other devices. The broadcast identifiers may be beacon signals or other identifiers that comply with various protocols for wireless communication. In many cases, the broadcast identifiers may be collected passively without creating a two-way communication session between the wireless transceiver and another device.

Each device may have a camera 136 and 144, respectively. The camera may collect an image that may be analyzed, tagged, and post processed by the device 102.

In some embodiments, the matching system 120 may interact with one or more social networks 146.

In one use scenario, a person's social networks may be used to augment or expand a set of candidate people for facial recognition and tagging. In such a use scenario, a broadcast identifier may be used to identify a first person. That person's social network may be accessed to find other people that are related to the first person and add the other people to a set of candidates for facial recognition. The logic is that people within the first person's social network have potential to be in physical proximity to the person when an image is captured, therefore those people may be considered when performing facial recognition.

In some such embodiments, several layers of analysis may be performed to match people. In a first layer, the people directly associated with the captured broadcast identifiers may be candidates for facial matching. If that set of candidates does not yield a successful match, an expanded set of candidates may be considered that includes people from each candidate's social networks.

In another use scenario, the matching system 120 may create albums of images for particular events. The albums may contain images taken at the event and may or may not be taken by someone within a user's existing social network. In such a use scenario, the images that contain the same broadcast identifiers may be grouped together and filtered for similar timestamps. The resulting group of images may be images taken in relatively close proximity and at the same time. Such a condition may be considered and event, which may be a concert, tradeshow, birthday party, holiday celebration, or other event.

In some embodiments, such a group may be further filtered to limit the album to the photographers who took any of the images, or expanded to include anyone identified in one or more of the images, or people in the social networks of the photographers or people identified in the images.

Figure 2:
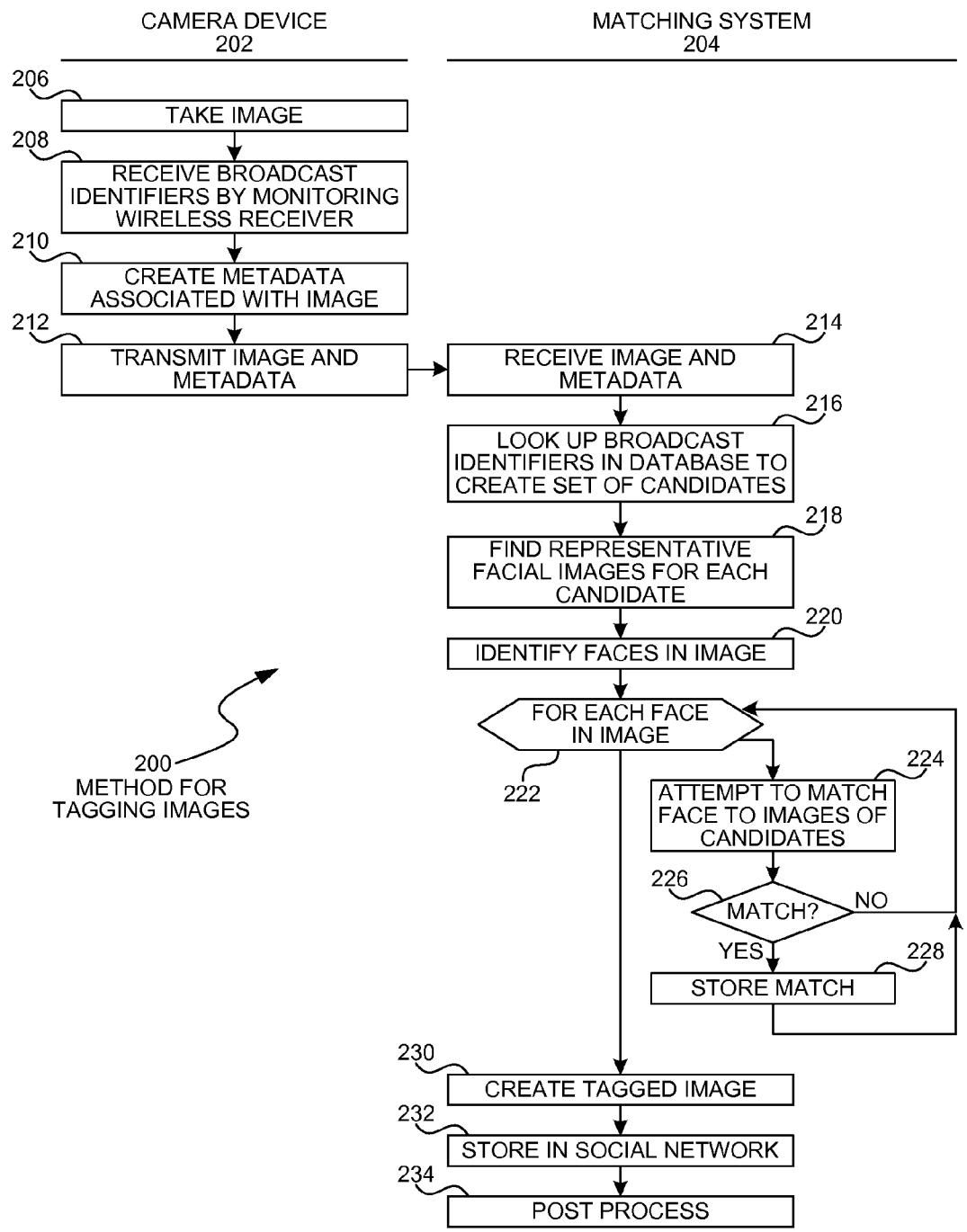
FIG. 2 is a timeline diagram of an embodiment showing a method for tagging images.

FIG. 2 is a timeline illustration of an embodiment 200 showing a method for tagging images using broadcast identifiers collected when an image is captured. Embodiment 200 is a simplified example of a method that may be performed by an image capture device and a matching system. The operations of the image capture or camera device 202 are illustrated in the left hand column and the operations of the matching system 204 are illustrated in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates a method by images may be captured and processed using broadcast identifiers to tag the images with people identified using facial recognition algorithms.

In block 206, the camera device 202 may take an image. The camera device may be any device with a camera, such as a handheld snapshot camera, cellular telephone, tablet computer, or other device.

Along with the image, the camera device 202 may receive and collect broadcast identifiers by monitoring a wireless receiver. In many cases, a device may have a wireless receiver or transceiver that operates on a personal area network (PAN), local area network (LAN), or other network type, including cellular telephony and satellite telephony. In many protocols, each device operating on the protocol may broadcast an identifier that may be used to connect to other devices in the network. These broadcast identifiers may be collected in block 204.

Different embodiments may collect the broadcast identifiers in different manners. In some embodiments, the device may monitor a wireless protocol for a period of time after an image is captured. In one such embodiment, the device may monitor one or more protocols for a period of seconds or minutes to capture broadcast identifiers.

In other embodiments, the camera device 202 may collect broadcast identifiers on an ongoing basis and may be collecting broadcast identifiers prior to taking the image in block 206.

Various metadata may be collected in block 206 for the image. The metadata may include the broadcast identifiers, but also a time or date stamp, Global Positioning System (GPS) coordinates, exposure parameters, or other metadata.

In some embodiments, the metadata may include the user or owner of the camera device 202.

The image and metadata may be transmitted to the matching system in block 212 and received in block 214. In some embodiments, a camera device 202 may instantly upload the image and metadata, while other embodiments may upload the image and metadata at a later time.

The matching system 204 may analyze the metadata to identify the broadcast identifiers, then look up the corresponding people from the user profile database in block 216. These people may make up a candidate list for facial recognition and tagging.

A representative facial image may be determined in block 218 for each of the candidate people. The facial image may come from user profiles in the user profile database, the user's social networks, or other locations. In many embodiments, multiple representative facial images may be used. In some cases, two or more still images may be used, while some embodiments may use video images that contain many images of a person.

All of the faces in an image may be located in block 220.

For each face in the image in block 222, an attempt may be made to match the face to images of the candidates in block 224. If the match is not successful, the process may return to block 222. If the match is successful, the match may be stored in block 228.

In some embodiments, the matching algorithm may consolidate images for matching. For example, a user may upload several images, each having the same person. The images may be grouped when they contain the same person, and the matching algorithm may use all of the images in the group for matching.

When determining the same person, various heuristics or algorithms may be used. For example, the matching algorithm may examine the person's clothing when the images are captured on the same date, and group matching faces that have corresponding matching clothing. Other heuristics may also be used to gather multiple images of a candidate person.

In some embodiments, an unsuccessful match may trigger a broader scope of candidate people. For example, a set of candidate people may be enlarged by identifying relationships through social networks or other relationships to additional people. The additional people may be added to the set of candidate people and the matching process of block 224 may be tried again.

After the faces have been matched with people, a tagged image may be created in block 230.

The tagged image may be stored in a social network or other location in block 232 and the image may be post processed in block 234. Two examples of post processing may be illustrated in embodiments 300 and 400 presented later in this specification.

Figure 3:
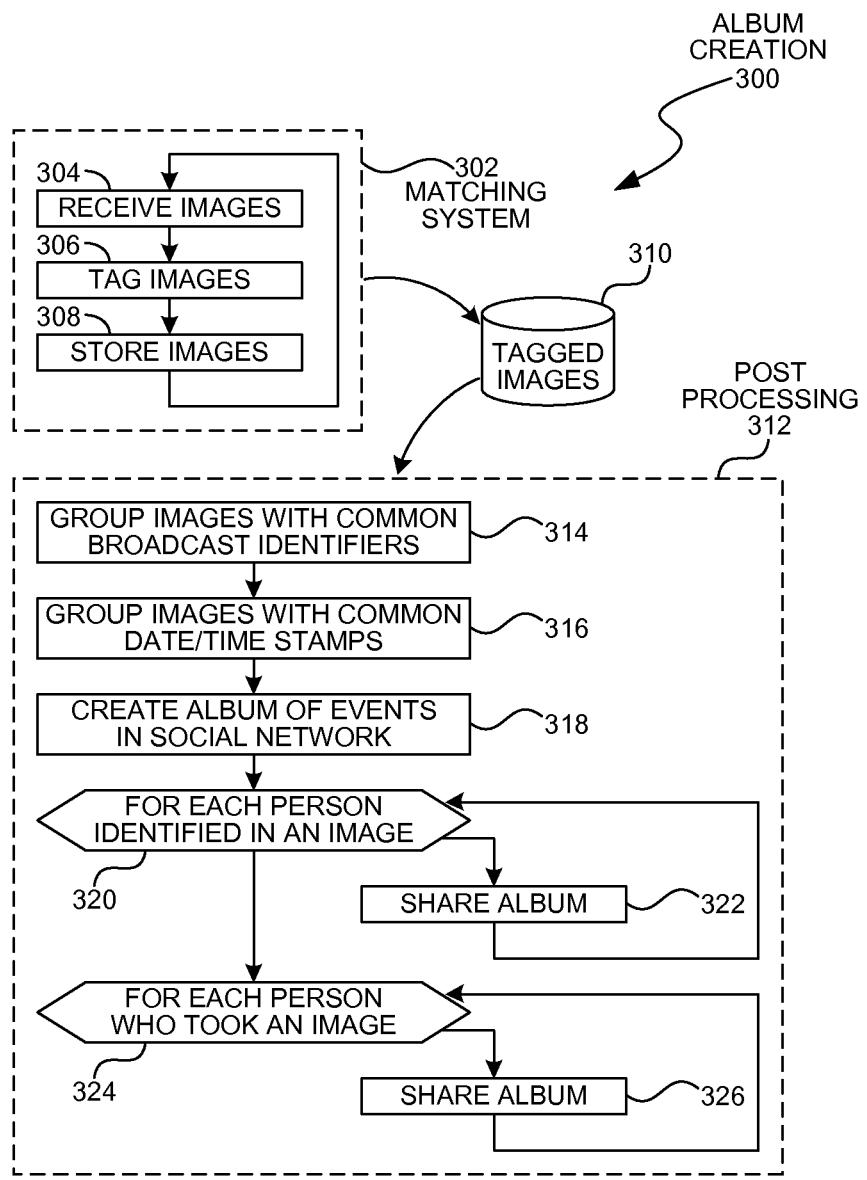
FIG. 3 is a flowchart of an embodiment showing a method for album creation.

FIG. 3 is a flowchart illustration of an embodiment 300 showing a method for creating albums using tagged images. Embodiment 300 illustrates a separate set of processes for a matching system 302 and a post processing operation 312. In some embodiments, one server or process may perform the matching system functions and a separate server or process may perform the post processing operations.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates an embodiment where tagged images may be organized into albums, which may be shared amongst members of a social network. The sharing may be performed after the various users give permission for their images to be shared with other people.

The basic steps of the matching system 302 are to receive images in block 304, tag the images in block 306, and store the images in block 308. The images may be stored into a database of tagged images 310.

The post processing operation 312 may analyze the tagged images 310 at some point in time after the tagging process has completed.

The post processing operation 312 may begin by grouping the images that have common broadcast identifiers in their metadata. This grouping may identify those images that were taken in the same general physical location. The images may be taken by different users or by the same user.

The same general physical location may be implied from the grouping because the images have common broadcast identifiers, meaning that the camera devices that took the images received the same identifier and therefore would be located within range of the device that broadcast the identifier.

In block 316, the groups from block 314 may be further grouped by date or time stamp. In the first grouping, the images may be grouped by physical proximity. The second grouping may group by time proximity. When both criteria are met, the resulting group of images may define an event.

An event may be any instance where one or more people take a number of images. The event may be enormous, such as a large technology tradeshow, or may be a small gathering for a child's birthday. The images that result in the groupings may be organized together into an album.

Different embodiments may further filter or screen the images. For example, an embodiment may further filter an album for a user to include only those images that contain people in his social network or images taken by people in his social network.

After the album is defined, for each person identified in an image in the album in block 320, the album may be shared with the person in block 322. Similarly, for each person who took at least one image in the album in block 324, the album may be shared with the person in block 326.

Embodiment 300 is merely one simple example of how the tagged images may be grouped using the broadcast identifiers to create albums. Other embodiments may have different criteria for creating albums or use different methodology for identifying images that are related to each other.

Figure 4:
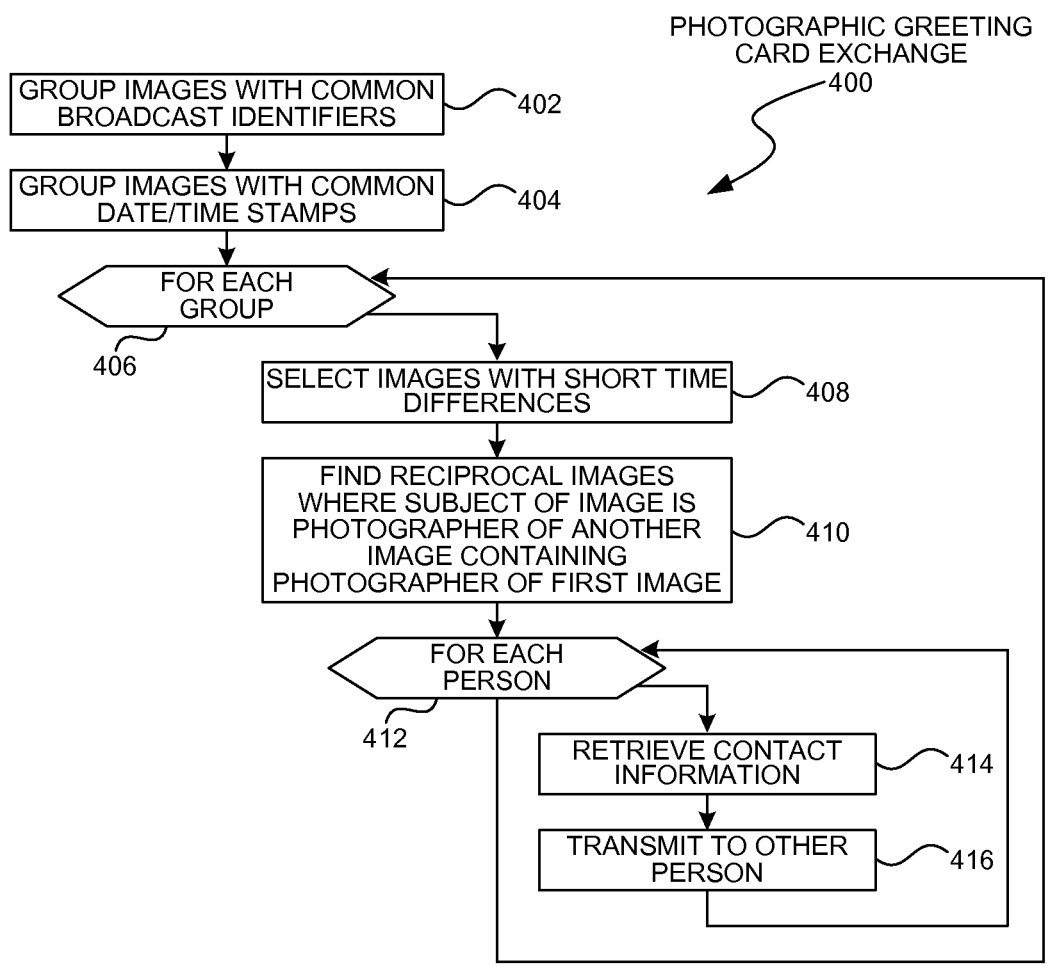
FIG. 4 is a flowchart of an embodiment showing a method for exchanging contact information.

FIG. 4 is a timeline illustration of an embodiment 400 showing a method for exchanging contact information through tagged images. Embodiment 400 is another example of post processing tagged images where people who take pictures of each other may have their contact information exchanged when their pictures are post processed.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 uses tagged images and the proximity of both physical space and time to identify instances where two people take pictures of each other. The action of taking pictures of each other may be identified during post processing as affirmation that the individuals may wish to exchange contact information.

In a typical use scenario, two people may meet at a conference, sporting event, bar, or other location. In order to exchange contact information, each person may take a picture of the other person. During post processing, the matching service may identify the two images and cause the people's contact information to be exchanged.

In block 402, the images may be grouped with common broadcast identifiers to establish physical proximity. In block 404, the images may be grouped in time using date or time stamps.

For each group in block 406, images with very short time differences may be selected. The short time differences may be those images taken within a few minutes or seconds of each other.

The system may look for reciprocal images, where the first person in a first image may be the photographer for a second image containing a second person, and where the second person took the first image. This matching scenario may indicate that the two people wish to exchange information. Some such embodiments may perform a match when the two images contain just a single face and when the face is very large. Such embodiments may limit the chances of someone inadvertently sharing information by limiting the match to specific conditions.

For each person in block 412, their contact information may be retrieved in block 414 and transmitted to the other person in block 416. In some embodiments, a user may approve the transmittal of their information to the other party prior to sending.

Figure 5:
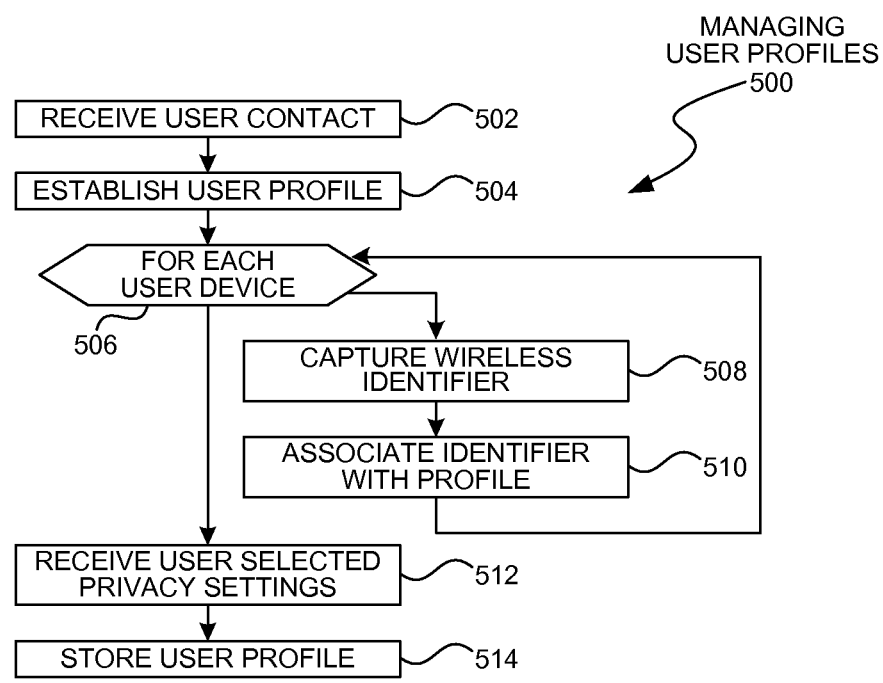
FIG. 5 is a flowchart of an embodiment showing a method for managing user profiles.

FIG. 5 is a flowchart illustration of an embodiment 500 showing a method for managing user profiles. Embodiment 500 is a simplified example of a method that may be performed by a profile manager, such as the profile manager 126 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The operations of embodiment 500 illustrate one mechanism by which a user may establish an account with a matching system and add information to a profile database that may be used by a matching system.

In block 502, the user may make contact with the profile manager and establish a user profile in block 504. The user profile may include a user name, password, alias or nickname, or other information. In some cases, a user may upload photographs, provide links to social network sites, or other activities. A user may also provide tagged images that have been manually or automatically tagged with person's names.

In some cases, the profile manager may collect personally identifiable information. In such cases, the user may give explicit permission for such information to be collected and may be able to restrict the usage of and access to such information.

For each device the user may register in block 506, a wireless identifier may be captured in block 508 and may be associated with the profile in block 510.

In many embodiments, a user may have a client device that has receivers for Bluetooth, WiFi, WiMAX, or other wireless devices. Such a client device may be a personal computer, for example. When the wireless identifier is captured in block 508, the user may be instructed to place their device in a discovery mode or to activate the device such that the client device may be able to sense the device. The client device may capture the identifier over the air and store the identifier. In some embodiments, the user may have to manually type an address, such as a MAC address, in order to capture the identifier.

After collecting identifiers for the various wireless devices, the user's privacy settings may be captured. In some embodiments, the user may permit access to the user's information for a limited number or type of applications, as well as restrict usage of the information to outside organizations.

The user profile may be stored in block 514.

In many embodiments, a user may be able to edit their profile repeatedly to add new devices, remove devices, change privacy settings, add or delete other information in the profile, or perform other edits or changes.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
    a database comprising broadcast identifiers associated with people; and
    a facial recognition system operable on a processor that:
        receives a first image comprising a first face said image being taken by a first user;
        receives a first broadcast identifier captured when said first image was taken;
        determines a first set of candidates for facial recognition from said database based on said first broadcast identifier;
        performs facial recognition on said first image to match said first image to one of said first set of candidates;
        receives a second image comprising a second face, said second image taken by a second user;
        receives a second broadcast identifier captured when said second image was taken;
        determines a second set of candidates for facial recognition from said database based on said second broadcast identifier; and
        performs facial recognition on said second image to match said second image to one of said second set of candidates.

2. The system of claim 1, said facial recognition system that further:
    identifies a first person from said database associated with the first broadcast identifier;
    identifies a second person associated with said first person from a social network connection between said first person and said second person; and
    adds said first person and said second person to said first set of candidates.

3. The system of claim 2, said social network connection being an explicit social network connection.

4. The system of claim 2, said social network connection being an implied social network connection.

5. The system of claim 1, said facial recognition system that further:
tags said first image with an identifier for said one of said first set of candidates to create a first tagged image.
6. The system of claim 5, said facial recognition system that further:
adds said first tagged image to a first social network associated with said first user.
7. The system of claim 6, said facial recognition system that further:
adds said first tagged image to a second social network associated with said one of said first set of candidates.
8. The system of claim 5 further comprising:
a matching system that:
establishes a social network relationship between said first user and said second user.
9. The system of claim 8, said matching system that further:
exchanges contact information between said first user and said second user.
10. The system of claim 1, said first broadcast identifier being a personal area network device broadcast identifier.
11. A method performed by at least one computer processor, said method comprising:
receiving a first image having a first broadcast identifier associated with said first image, said first image comprising a first face;
creating a first set of candidate persons by looking up said first at broadcast identifier in a user database to identify at least one candidate person, said user database comprising broadcast identifiers associated with persons;
matching said first face with each person in said first set of candidate persons to determine a first match;
receiving a second image having a second broadcast identifier associated with said second image, said second image comprising a second face;
creating a second set of candidate persons by looking UP said second broadcast identifier in the user database to identify at least one candidate person; and
matching said second face with each person in said second set of candidate persons to determine a second match.
12. The method of claim 11 further comprising:
searching a social network to identify a plurality of candidate persons associated with said second person; and
adding said plurality of candidate persons to said first set of candidate persons.
13. The method of claim 12 further comprising:
identifying a first profile for said first persona.

14. The method of claim 13,
wherein said first profile comprising a social network.
15. The method of claim 12, said first match being performed using facial recognition.
16. A method performed by at least one computer processor, said method comprising:
receiving a first image comprising first metadata, said first metadata comprising a first set of broadcast identifiers captured when said first image was taken;
looking up said first set of broadcast identifiers to determine a first set of candidate persons;
attempting to match a first face in said first image with faces from said first set of candidate persons to determine a first match comprising a first person;
tagging said first face in said first image with said first match;
receiving a second image comprising second metadata, said second metadata comprising a second set of broadcast identifiers captured when said second image was taken;
looking up said second set of broadcast identifiers to determine a second set of candidate persons;
attempting to match a second face in said second image with faces from said second set of candidate persons to determine a second match comprising a second person; and
tagging said second face in said second image with said second match.
17. The method of claim 16 further comprising:
matching said first image to said second image when said first person took said second image and said second person took said first image.
18. The method of claim 17 further comprising:
exchanging information about said first person with said second person based on said matching.
19. The method of claim 17, said matching being made when said first image has a first timestamp that is within a predefined time from a second timestamp being associated with said second image.
20. The method of claim 17, said matching being made when a first broadcast identifier for a first device that captured said first image is in said second set of broadcast identifiers and when a second broadcast identifier for a second device that captured said second image is in said first set of broadcast identifiers.

* * * * *